(12) United States Patent
Wei et al.

(10) Patent No.: US 12,468,620 B2
(45) Date of Patent: Nov. 11, 2025

(54) INTERLOCKING DATA SAFE CONVERSION METHOD FOR FORMAL VERIFICATION AND TRANSLATOR

(71) Applicant: CASCO SIGNAL CO., LTD., Shanghai (CN)

(72) Inventors: Min Wei, Shanghai (CN); Yanqin Wang, Shanghai (CN); Mingyao Zhang, Shanghai (CN); Shaoxin Wang, Shanghai (CN); Fan Yang, Shanghai (CN); Xiao Lui, Shanghai (CN); Cheng Zhang, Shanghai (CN); Wenyan Zhang, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 0 days.

(21) Appl. No.: 17/792,805

(22) PCT Filed: Sep. 11, 2021

(86) PCT No.: PCT/CN2021/129538
§ 371 (c)(1),
(2) Date: Oct. 13, 2022

(87) PCT Pub. No.: WO2022/213599
PCT Pub. Date: Oct. 13, 2022

(65) Prior Publication Data
US 2024/0220392 A1    Jul. 4, 2024

(30) Foreign Application Priority Data
Apr. 6, 2021 (CN) .......................... 202110368555.1

(51) Int. Cl.
*G06F 11/3604* (2025.01)
*B61L 19/06* (2006.01)
*G06F 8/51* (2018.01)

(52) U.S. Cl.
CPC .......... *G06F 11/3608* (2013.01); *B61L 19/06* (2013.01); *G06F 8/51* (2013.01); *B61L 2019/065* (2013.01)

(58) Field of Classification Search
CPC .......... G06F 11/3608; G06F 8/51; G06F 8/30; B61L 19/06; B61L 2019/065; B61L 27/33
See application file for complete search history.

(56) References Cited

U.S. PATENT DOCUMENTS 4,740,972 A * 4/1988 Rutherford, Jr. ......... B61L 1/20
                                                                  714/823
5,463,552 A * 10/1995 Wilson, Jr. ............. B61L 21/04
                                                                  246/131
(Continued)

FOREIGN PATENT DOCUMENTS

CN    103440349 A    12/2013
CN    106776515 A    5/2017
(Continued)

OTHER PUBLICATIONS

Parillaud, Camille, Yoann Fonteneau, and Fabien Belmonte. "Interlocking formal verification at alstom signalling." Reliability, Safety, and Security of Railway Systems. Modelling, Analysis, Verification, and Certification: Third International Conference, RSSRail 2019, Lille, France (Year: 2019).*

(Continued)

*Primary Examiner* — Matthew J Brophy
(74) *Attorney, Agent, or Firm* — Amster Rothstein & Ebenstein LLP

(57) ABSTRACT

An interlocking data safe conversion method for formal verification and a translator. Two translators with same functions are developed by adopting different programming methods and programming languages. An input file of each of the translators at least comprises an interlocking information table in interlocking data, a device interface infor- (Continued)

mation table, a station yard description data and interlocking Boolean logic data. Consistency of output files of the two translators is compared to realize detection process failure.

7 Claims, 3 Drawing Sheets

(56) References Cited

U.S. PATENT DOCUMENTS

| | | | | |
|---|---|---|---|---|
| 6,122,590 | A * | 9/2000 | Germann | B61L 19/06 701/19 |
| 9,996,238 | B2 * | 6/2018 | Prodhomme | G06F 11/3672 |
| 2008/0189689 | A1 * | 8/2008 | Tramontana | G06F 9/44589 717/143 |
| 2014/0310673 | A1 | 10/2014 | Alfieri | |
| 2015/0268655 | A1 * | 9/2015 | Park | G05B 19/05 700/86 |
| 2015/0344050 | A1 * | 12/2015 | Yanai | B61L 21/04 246/3 |
| 2016/0274870 | A1 | 9/2016 | Seidman | |
| 2017/0109421 | A1 * | 4/2017 | Stearn | G06F 16/258 |
| 2017/0116283 | A1 * | 4/2017 | Park | G06F 16/24568 |
| 2019/0193766 | A1 * | 6/2019 | Ballesteros | G06F 9/4401 |
| 2022/0185350 | A1 * | 6/2022 | Kindt | B61L 1/18 |
| 2024/0119031 | A1 * | 4/2024 | Lahiri | G06F 16/2365 |

FOREIGN PATENT DOCUMENTS

| | | |
|---|---|---|
| CN | 108459860 A | 8/2018 |
| CN | 108536445 A | 9/2018 |
| CN | 108985073 A | 12/2018 |
| CN | 109143952 A | 1/2019 |
| CN | 109739740 A | 5/2019 |
| CN | 110262794 A | 9/2019 |
| CN | 110347405 A | 10/2019 |
| CN | 111382579 A | 7/2020 |
| CN | 111845866 A | 10/2020 |
| CN | 113031934 A | 6/2021 |
| WO | 9840833 A1 | 9/1998 |
| WO | 2007041901 A1 | 4/2007 |

OTHER PUBLICATIONS

Han, Li, et al. "Safety requirements specification and verification for railway interlocking systems." 2016 IEEE 40th annual computer software and applications conference (COMPSAC). vol. 1. IEEE, 2016. (Year: 2016).*

Kanso, Karim, Faron Moller, and Anton Setzer. "Automated verification of signalling principles in railway interlocking systems." Electronic Notes in Theoretical Computer Science 250.2 (2009): 19-31. (Year: 2009).*

Bonacchi, Andrea, et al. "Validation process for railway interlocking systems." Science of Computer Programming 128 (2016): 2-21. (Year: 2016).*

Busard, Simon, et al. "Verification of railway interlocking systems." arXiv preprint arXiv:1506.03554 (2015). (Year: 2015).*

China National Intellectual Property Administration, Search Report for China Patent Application No. 202110368555.1, May 23, 2022, 4 pp., China.

International Search Report for Application No. PCT/CN2021/129538, Feb. 10, 2022, 4 pp., China.

Written Opinion for Application No. PCT/CN2021/129538, Feb. 10, 2022, 3 pp., China.

Camille Parillaud et al., "Interlocking Formal Verification at Alstom Signalling", Apr. 24, 2019, Advances in Databases and Information Systems, Springer International Publishing, Cham, Switzerland, pp. 215-225. ISBN: 978-3-319-10403-4.

Alexandra Halchin et al., "Handling B models in the PERF integrated verification framework: Formalised and certified embedding", May 7, 2020, Science of Computer Programming, Elsevier BV, Netherlands, vol. 196 (31 pages). ISSN: 0167-6423.

Junjie Chen et al., "An Empirical Comparison of Compiler Testing Techniques", May 14, 2016, Software Engineering, ACM, 2 Penn Plaza Suite 701 New York NY 10121-0701 USA, pp. 180-190. ISBN: 978-1-4503-3900-1.

European Patent Office, Extended European Search Report and Written Opinion for European Patent Application No. 21912329.6 (9 pages total), Nov. 24, 2023, Munich, Germany.

\* cited by examiner

INTERLOCKING DATA SAFE CONVERSION METHOD FOR FORMAL VERIFICATION AND TRANSLATOR

CROSS-REFERENCE TO RELATED APPLICATIONS

This application is a U.S. national stage entry under 35 U.S.C. § 371 of PCT International Patent Application No. PCT/CN2021/129538, filed Sep. 11, 2021, which claims priority to Chinese Patent Application No. 202110368555.1, filed Apr. 6, 2021, the contents of each of which are incorporated herein by reference in their entirety.

FIELD OF TECHNOLOGY

The present invention relates to an interlocking data safe conversion method for formal verification and a translator.

BACKGROUND

An interlocking system is a core device that guarantees the operating safety of a train in a rail traffic signal system to realize functions such as route selection, signal clearing and railway switching. The interlocking system fails to probably lead to accidents such as derailing and rear-ending, which directly affects the operating safety of railway transportation. In the interlocking system, interlocking data is a carrier to realize an interlocking logic function of a specific station. The interlocking data designed mistakenly will directly lead to failure of the interlocking function. Therefore, it is a necessary link to guarantee the safe operation of the interlocking system by verifying whether the interlocking logic meets the safety demand or not, i.e., safely verifying and confirming the interlocking data. However, as the interlocking system is huge and complex in logic, many functional modules are coupled and there are various special function scenes applied on site, there is a huge challenge to safely verify and confirm the interlocking data as a result of these factors. Thus, it has been hard to cover some application scenes of the interlocking system through a conventional test verification process by way of manual test, potential mistaken data channels cannot be tested, and there are potential safety risks if such data is issued to the scenes.

SUMMARY

The objective of the present invention is to provide an interlocking data safe conversion method for formal verification and a translator. It is unnecessary to perform specific formal development for each station, so that the technical cost and the design risk are reduced, and the present invention is high in safety, good in compatibility, high in universality and wide in application range.

In order to achieve the objective, the present invention provides a translator, where the translator converts an input file into a format file capable of being identified by a formal verification tool.

The translator identifies keywords of a header in the input file, and converts a variable type associated with each keyword according to a conversion rule and rearranges the converted data to generate the format file capable of being identified by the formal verification tool.

The conversion rule is as follows:

with regard to an integer type I, the input data is an integer and a null value or NA, and the translator converts an integer into an integer and converts the null value or the NA into null;

with regard to a Boolean type B, the input data is 1, 0, Y, N, an null value or NA, and the translator converts 1 and Y into true, converts 0 and N into false and converts the null value and NA into null;

with regard to a text type T, the input data is any character string, null value or NA, and the translator outputs the character string intact to convert the null value and NA into null; and with regard to a form type L, the input data is any character string, and the translator separates data in a form with ',' and outputs '[ ]' for an empty form.

The rearrangement method includes: performing arrangement according to an original sequence of the input data, identifying the null value or the NA in the input data and rewriting it into null to realize rearrangement.

The present invention further provides an interlocking data safe conversion method for formal verification. Two translators with same functions are developed by adopting different programming methods and programming languages. An input file of each of the translators at least includes an interlocking information table in interlocking data, a device interface information table, a station yard description data and interlocking Boolean logic data. Consistency of output files of the two translators is compared to realize detection of process failure, so that safe conversion of data is guaranteed.

The translator converts the interlocking information table and the device interface information table into LCF format files.

The translator converts the station yard description data into LCF format files.

The translator converts the interlocking Boolean logic table into HLL format files.

The translator converts Chinese/English punctuations, all characters and Chinese characters in the interlocking information table into English punctuations uniformly.

The translator reads turnout position information in the interlocking information table and differentiates positioning and anti-positioning of a turnout with an independent conversion description in the generated LCF format files;

the translator reads beyond limit conditions of a section in the interlocking information table and differentiates the beyond limit conditions with an independent conversion description in the generated LCF format files; and the translator reads conflicting routes in the interlocking information table and corresponding conflicting route types, and differentiates the conflicting routes and the conflicting route types with an independent conversion description in the generated LCF format files.

The translator identifies turnout position information of the input data and shall differentiate positioning and anti-positioning of the turnout and whether the turnout is an inner turnout in a route, a protective turnout and a driven turnout with an independent conversion description in the generated LCF format files; and the translator identifies section state information of the input data and differentiates beyond limit conditions of the inner turnout of the route, a beyond limit section outside the route and a conditional beyond limit section in the generated LCF format files.

The present invention has the beneficial effects:
1. High Universality and Wide Application Range Specific interlocking data used in different stations can be converted in batched via the technology, and formal verification of the interlocking data is realized in combination with universal formal safety need and object model. It is unnecessary to perform specific formal development for each specific station, so that the technical cost and risk in a repeated development process are avoided.

2. High Safety

The technology accepting the demand of European Railway Safety Standard EN50128 on T3 tool software is realized by two translators using different programming languages, so that random failure occurring in the operating process of each of the translators can be detected by eventually comparing consistency of output data of the two translators. Meanwhile, formal development of the interlocking rule again is avoided, so that the risk of introducing design defects is reduced.

3. High Compatibility

The technology can be compatible with interlocking information table files stored in different formats such as .xls or .xlsx and can identify Chinese and English punctuations in the input files to improve the availability of the software for uniform processing.

4. Introduction of LCF Files and HLL Format Files

The LCF format is a structural data format based on jason and has the characteristic of WYSIWYG and being suitable for search and historical edition comparison. The HLL format is an advanced formal language format which boosts abundant language features and data types.

DETAILED DESCRIPTION OF THE EMBODIMENTS

Figure 1:
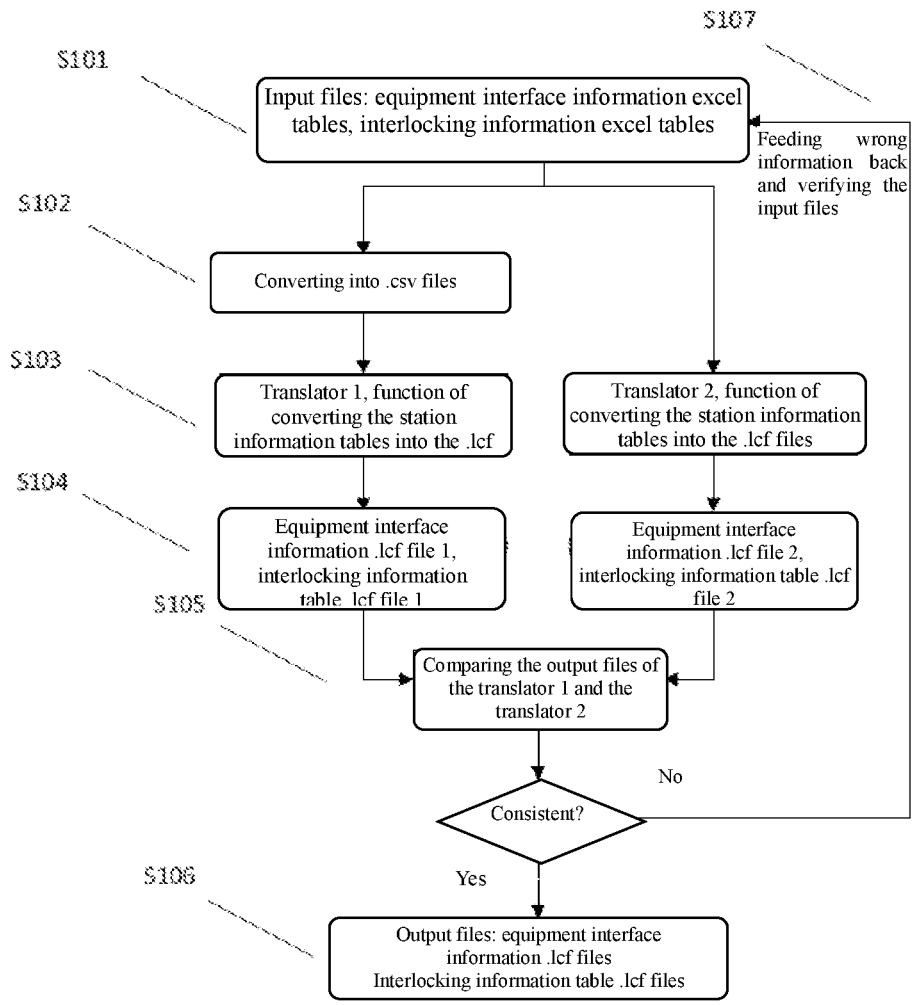
FIG. 1 is a conversion flow diagram of an interlocking information table and a device interface information table in an embodiment of the present invention.

Further description of the present invention in detail will be made below in combination with drawings and specific embodiments. The advantages and features of the present invention are clearer according to description and claims below. It is to be noted that the drawings in a quite simplified form with an inaccurate ratio are merely used for describing objectives of the embodiments of the present invention in an assistant manner conveniently and clearly.

Preferred embodiments of the present invention are described specifically below according to FIG. 1 to FIG. 3.

The interlocking data is a logic set of interlocking relations and function descriptions in the interlocking system. A designer summarizes an interlocking demand design to reflect a restrictive relation among signal devices according to different usage scenes, thereby forming a demand design. Based on the demand design, these restrictive relations are settled to a Boolean BOOL expression, i.e., a universal interlocking rule, with interlocking meaning by using logical operators such as "and", "or" and "not". In a specific station, a data manufacturer instantiates the universal interlocking rule (associating n actual device with variables in the universal interlocking rule) to generate specific interlocking data by configuring combination with an interlocking logic generation tool according to a name and an attribute of an actual signal device of the specific station, position relations among the devices and the like.

The formal verification is a safety demand standard adopting a strict mathematical language definition system, which establishes the object model and the safety demand rule by means of a formal language and traverses the model by using a model detection method to verify that the model fully complies with the safety demand rule. The verification method has the advantages of high degree of automation, high scene coverage and the like. Therefore, performing safety verification on the interlocking data by using the formal method is an effective means to prevent safe escape of the model corresponding to the interlocking data.

The specific interlocking data is verified, i.e., whether introduction of the specific interlocking data into the actual usage scene leads to harm or not is verified, for example, conditions such as derailing and collision. It is necessary to perform conventional formal verification based on formal development, i.e., formal language development is used at the beginning of the demand design stage. However, with regard to the interlocking data which has been used on site, the cost needed to perform formal development again is very high, and such a wide alteration is prone to causing unknown design defects, which affects the safety of the system.

A key link for formal verification of the interlocking data is to convert specifically applied interlocking data into a data form capable of being identified by the formal verification software so as to fuse the interlocking data of the specific station into the model of formal verification. As the part of data is safety key data, a mistaken data conversion process will lead to mistaken interlocking data. Therefore, reasonable methods and tools must be used in the data conversion process so as to guarantee correctness, consistency and integrity.

The present invention provides an interlocking data safe conversion method for formal verification. Two translators with same functions are developed by way of double link development, i.e., by way of different programming methods and programming languages. It aims to detect calculating errors of any translator by comparing the consistency of the output files of the two translators. Under a normal circumstance, outputs of the two translators shall be identical. The translator can convert the interlocking information table, the device interface information table, the station yard description data and the interlocking Boolean logic data in the interlocking data into the format files capable of being identified by the formal verification tool, i.e., the HLL format files and the LCF format files. The process failure is detected by eventually comparing the consistency of the output files of the two translators, thereby guaranteeing safe conversion of the data. After the specific interlocking data is converted into the data format capable of being identified by the formal verification tool, by using the universal interlocking safety demand described by the formal language and the object model cooperatively, parameters in the safety demand are associated with the devices and attributes in the specific interlocking data, so that the instantiation process of the model is completed, and eventually, formal verification of the specific interlocking data is realized.

In an embodiment of the present invention, the translators are developed by using different programming languages, which are named translator 1 and translator 2. In consideration of differentiation and modularization of the double link software as well as object structure-oriented programming, the translator 1 is developed by using an OCaml programming language and the translator 2 is developed by using a Python programming language. The translator 1 and the translator 2 use the same interlocking data as input, and output the target files respectively by means of independent operations. By identifying the station number of the interlocking data, it is judged that the station numbers in the different input files are consistent, and it starts to convert the format of the interlocking data. Inputs of the translators are files such as "interlocking information tables", "device interface information tables", "station yard description data" and "interlocking Boolean logic data". These files define templates for filling the station interlocking data, for example, the file header stipulates the type, quantity, names of traffic signal machines and the like. With regard to different stations, in light of specific conditions, specific data (the specific data refers to the interlocking data actually used by a certain station and is data obtained by instantiating the "universal interlocking rule" in combination with the actual device attribute and device layout of the station) fill the corresponding position of the file according to regulation of the header, and therefore, although the interlocking data of different stations is different, the translators can retrieve corresponding information according to key words of the header in the file so as to achieve a universal effect.

By compiling a judging condition in the translator, the key words of the header in the input files are identified, so that the corresponding data of the specific data is retrieved, for example, device attribute, device position information and the like. Then this information is rearranged to eventually form the format files (the HLL files and the LCF files) capable of being identified by the "formal verification software" and output the files.

Specifically, first of all, the key words of the header in the input files are judged. Each of the key boards is associated with a variable type of this type of data (I: integer type; B: Boolean type; T: text type; L: form type), where with regard to the integer type I, the input data can be an integer and a null value or NA, and the translator converts an integer into an integer and converts the null value or the NA into null; with regard to the Boolean type B, the input data can be 1, 0, Y, N, an null value or NA, and the translator converts 1 and Y into true, converts 0 and N into false and converts the null value and NA into null; with regard to the text type T, the input data can be any character string, null value or NA, and the translator outputs the character string intact to convert the null value and NA into null; and with regard to the form type L, the input data can be any character string, and the translator separates data in a form with ',' and outputs '[ ]' for an empty form.

Arrangement is performed according to an original sequence of the input data, the key words such as the null value or the NA in the input data are identified, and it is rewritten into null to realize rearrangement.

The software failure in the conversion process is detected by comparing the consistency of the output files of the translator 1 and the translator 2, thereby guaranteeing the safety of conversion.

As shown in FIG. 1, in an embodiment of the present invention, the interlocking information table (excel) and the device interface information table (excel) are converted into .lcf format files to obtain the interlocking information table.lcf files and the device interface information table.lcf files. Chinese/English punctuations, all characters and Chinese characters in the interlocking information table such as commas ",", colons ":", round brackets "( )", strikes "-" and "@" can be identified and are uniformly converted into/ English punctuations in the generated .lcf files. Meanwhile, the turnout position information in the interlocking information table can be read, and positioning and anti-positioning of a turnout are differentiated with an independent conversion description in the generated .lcf format files. The beyond limit conditions of a section in the interlocking information table can be read, and the beyond limit conditions are differentiated with an independent conversion description in the generated .lcf format files. Conflicting routes in the interlocking information table and corresponding conflicting route types can be read, and the conflicting routes and the conflicting route types are differentiated with an independent conversion description in the generated .lcf format files.

Detailed description on the steps in the FIG. 1 is made below:

In the step S101, it is prepared to input the interlocking information table and the device interface information table, where the device interface information table can include a radio block center, a train control center and code bit information; the input files are stored in excel table formats which can be compatible with two different formats: .xls and .xlsx;

in the step S102, the excel tables of the input files are converted into .csv formats which are used as input of the translator 1 in the step S103;

in the step s103, the translator 1 and the translator 2 are used to select corresponding input file paths and operate data conversion functions respectively;

in the step S104, both the translator 1 and the translator 2 output the interlocking information table.lcf files and the device interface information table.lcf files, and the output files are named different file names to differentiate the files obtained by using different translators;

in the step S105, the output files of the translator 1 and the translator 2 are compared to determine whether they are completely consistent or not; if yes, it enters the step S106 to output the interlocking information table.lcf files and the device interface information table.lcf files; and if no, there is no files output and it enters the step S107 to report wrong information so as to verify the input files.

Figure 2:
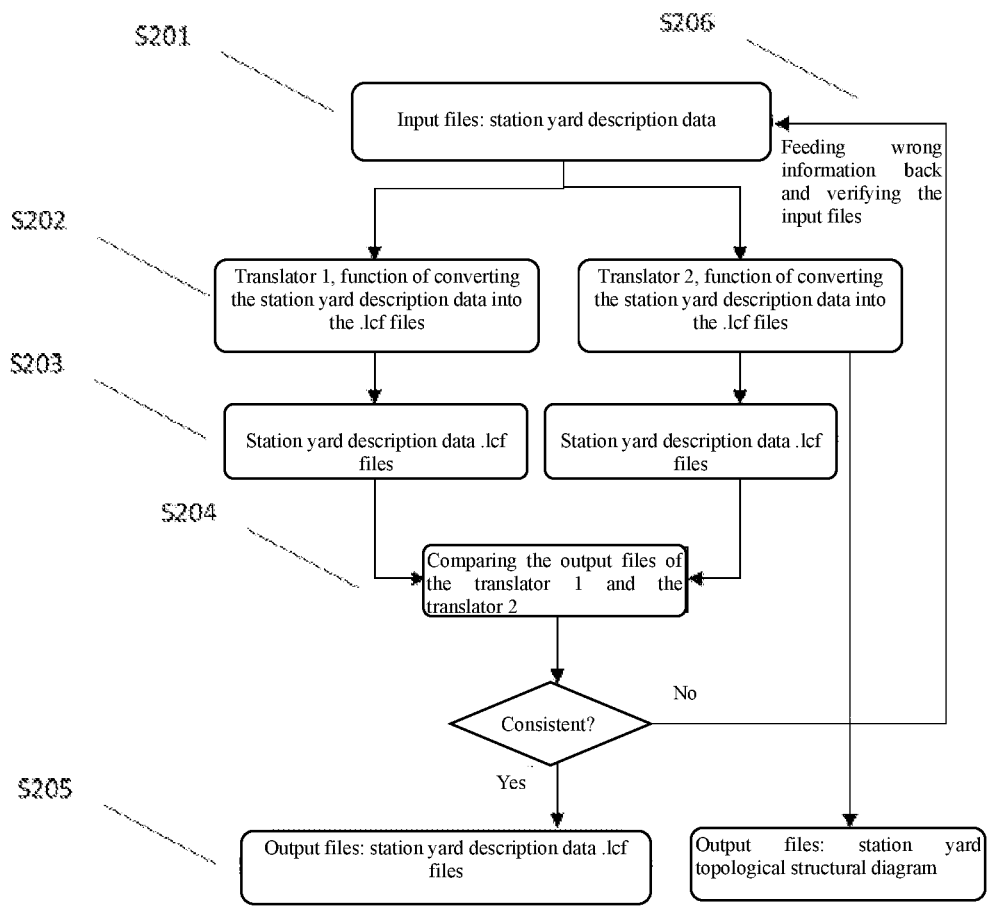
FIG. 2 is a conversion flow diagram of station yard description data in an embodiment of the present invention.

As shown in FIG. 2, in an embodiment of the present invention, the station yard description data is converted into the .lcf format files to obtain the station yard description data.lcf files and a station yard topological structural diagram capable of being used for supporting formal verification and formal test. The turnout position information of the input data can be identified, positioning and anti-positioning of the turnout and whether the turnout is an inner turnout in a route, a protective turnout and a driven turnout shall be differentiated with an independent conversion description, and they are recorded in the generated LCF format files. The section state information of the input data can be identified, beyond limit conditions of the inner turnout of the route, a beyond limit section outside the route and a conditional beyond limit section are differentiated, and they are recorded in the generated LCF format files.

In addition, in the process of converting the station yard description data, the integral station yard topological structural diagram can be generated automatically according to the connecting attribute among the devices in the input files. Virtual traffic signal machine devices in the input files can be identified and are drawn in a layout with dedicated traffic signal machine device graphs; insulation joints can be added automatically in the drawn layout; and check point devices described in the input files can be identified, and corresponding non-continuous route check points, operating direction check points and protective turnout Bool check points are drawn in the layout according to subtype types of the check point devices. In the present invention, the station yard description data is converted into the .lcf format files, and the formal verification tool can directly generate the station yard topological structural diagram by reading the .lcf format files, so that work of drawing the structural diagram manually is canceled. The implementation process thereof is as follows: first of all, the input file "station yard description data" includes information such as the number, the attribute and the position coordinates of each of the devices, the number of the previous device (pre) and the number of the next device (next); the output .lcf format file includes the name of each of the devices, the corresponding node (node), the edge (edge) between the nodes; the translator reads the position coordinates of the input file to write the node and the numbers of the previous and next devices to write the edge so as to determine the edge and the direction between the devices. Finally, the formal verification tool can draw a station yard diagram by reading the above information.

Detailed description on the steps in the FIG. 2 is made below:

In the step S201, it is prepared to input the station yard description data which includes topological structural information of the devices in the station such as a common route, a long route, a signal device, a turnout device, a section device and an alarm device;

in the step S202, the translator 1 and the translator 2 are used to select corresponding input file paths and operate data conversion functions;

in the step S203, both the translator 1 and the translator 2 output the station yard description data .lcf files, and meanwhile, the translator 2 output the topological structural diagram of the station device additionally; the station yard description data .lcf files output by the two application software are named different file names to differentiate the files obtained by using different translators; and in the step S204, the output files of the translator 1 and the translator 2 are compared to determine whether they are completely consistent or not; if yes, it enters the step S205 to output the station yard description data .lcf files; and if no, there is no files output and it enters the step S206 to report wrong information so as to verify the input files.

Figure 3:
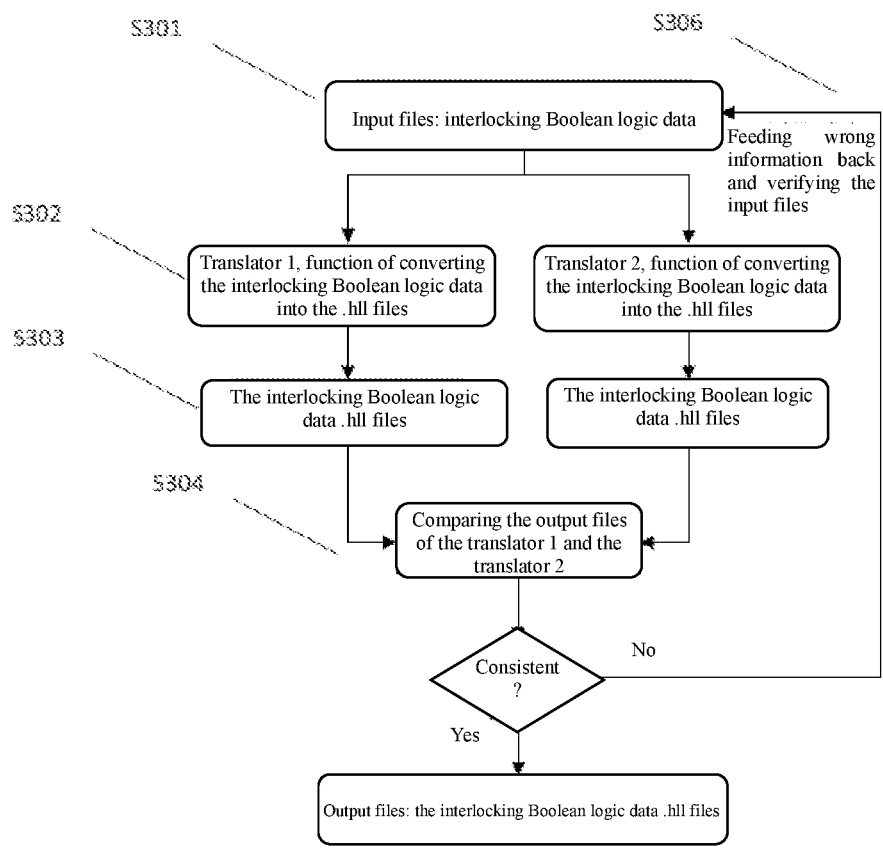
FIG. 3 is a conversion flow diagram of interlocking Boolean logic data in an embodiment of the present invention.

As shown in FIG. 3, in an embodiment of the present invention, the interlocking Boolean logic data is converted into the .HLL format files to obtain the interlocking Boolean logic data .HLL files, thereby, verifying whether the interlocking Boolean logic data can meet all interlocking safety demands or not. Detailed description on the steps in the FIG. 3 is made below:

in the step S301, it is prepared to input the interlocking Boolean logic data;

in the step S302, the translator 1 and the translator 2 are used to select corresponding input file paths and operate data conversion functions respectively;

in the step S303, both the translator 1 and the translator 2 output the interlocking Boolean logic data .HLL files; and in the step S304, the output files of the translator 1 and the translator 2 are compared to determine whether they are completely consistent or not; if yes, it enters the step S305 to output the interlocking Boolean logic data .HLL files; and if no, there is no files output and it enters the step S306 to report wrong information so as to verify the input files.

In the embodiment of the present invention, the interlocking information table (excel) and the device interface information table (excel) can be converted into the .lcf format files, the station yard description data can be converted into the .lcf format files, and the interlocking Boolean logic data can be converted into the .HLL format files, or the three conversion processes are operated after being integrated by the software.

Compared with the prior art, the present invention has the following beneficial effects:

1. High Universality and Wide Application Range

Specific interlocking data used in different stations can be converted in batched via the technology, and formal verification of the interlocking data is realized in combination with universal formal safety need and object model. It is unnecessary to perform specific formal development for each specific station, so that the technical cost and risk in a repeated development process are avoided.

2. High Safety

The technology accepting the demand of European Railway Safety Standard EN50128 on T3 tool software is realized by two translators using different programming languages, so that random failure occurring in the operating process of each of the translators can be detected by eventually comparing consistency of output data of the two translators. Meanwhile, formal development of the interlocking rule again is avoided, so that the risk of introducing design defects is reduced.

3. High Compatibility

The technology can be compatible with interlocking information table files stored in different formats such as .xls or .xlsx and can identify Chinese and English punctuations in the input files to improve the availability of the software for uniform processing.

4. Introduction of LCF Files and HLL Format Files

The LCF format is a structural data format based on jason and has the characteristic of WYSIWYG and being suitable for search and historical edition comparison. The HLL format is an advanced formal language format which boosts abundant language features and data types.

Although the content of the present invention has been described in details through the above preferred embodiments, it should be realized that the above description should not be considered as limit to the present invention. Many modifications and variations of the present invention will be apparent to those skilled in the art who have read the above content. Therefore, the scope of the present invention shall be defined by the appended claims.

The invention claimed is:

1. A translator, comprising:
one or more processors; and
memory and computer program code stored in memory and running on the one or more processors, wherein the computer program code and memory are configured, when executed by the one or more processors, to cause the one or more processors to convert an input file into a format file capable of being identified by a formal verification tool,
wherein the one or more processors identifies a header keyword in the input file, and converts a variable type associated with each keyword according to a conversion rule and rearranges the converted data to generate the format file capable of being identified by the formal verification tool; and
wherein the conversion rule comprises:
with regard to an integer type I, the input data is an integer, a null value, or NA, and the one or more processors converts an integer into an integer and converts the null value and the NA into null;
with regard to a Boolean type B, the input data is 1, 0, Y, N, a null value, or NA, and the one or more processors converts 1 and Y into true, converts 0 and N into false and converts the null value and the NA into null;

with regard to a text type T, the input data is any character string, a null value, or NA, and the one or more processors outputs the character string intact and converts the null value and the NA into null; and with regard to a form type L, the input data is any character string, and the one or more processors separates data in a form with ',' and outputs '[ ]' for an empty form; and wherein the input file comprises an interlocking information table in interlocking data, a device interface information table, a station yard description data, and interlocking Boolean logic data; and wherein the one or more processors converts the interlocking information table and the device interface information table into an LCF format file; and wherein:

the one or more processors reads turnout position information in the interlocking information table and differentiates positioning and anti-positioning of a turnout with an independent conversion description in the generated LCF format file;

the one or more processors reads beyond limit conditions of a section in the interlocking information table and differentiates the beyond limit conditions with an independent conversion description in the generated LCF format file; and the one or more processors reads conflicting routes in the interlocking information table and corresponding conflicting route types, and differentiates the conflicting routes and the conflicting route types with an independent conversion description in the generated LCF format file.

2. The translator according to claim 1, wherein the one or more processors rearranges the converted data according to an original sequence of the input data, identifying the null value or the NA in the input data, and rewriting the null value and the NA into null.

3. An interlocking data safe conversion method for formal verification, comprising:
    developing two translators with same functions according to claim 1 by adopting different programming methods and programming languages; and
    comparing consistency of output files of the two translators to realize detection process failure.

4. The interlocking data safe conversion method for formal verification according to claim 3, wherein each of the two translators converts the station yard description data into the LCF format file.

5. The interlocking data safe conversion method for formal verification according to claim 3, wherein each of the two translators converts the interlocking Boolean logic table into an HLL format file.

6. The interlocking data safe conversion method for formal verification according to claim 3, wherein each of the two translators converts Chinese/English punctuations, all characters and Chinese characters in the interlocking information table into English punctuations uniformly.

7. The interlocking data safe conversion method for formal verification according to claim 4, wherein each of the two translators identifies turnout position information of the input data and differentiates positioning and anti-positioning of the turnout and whether the turnout is an inner turnout in a route, a protective turnout and a driven turnout with an independent conversion description in the generated LCF format file; and
    each of the two translators identifies section state information of the input data and differentiates beyond limit conditions of the inner turnout of the route, a beyond limit section outside the route and a conditional beyond limit section in the generated LCF format file.

* * * * *